Patented Nov. 17, 1942

2,302,288

UNITED STATES PATENT OFFICE 2,302,288

POLYETHYLENE UREAS

Herbert Bestian, Frankfort-on-the-Main, Germany; vested in the Alien Property Custodian No Drawing. Application September 26, 1940, Serial No. 358,478. In Germany June 24, 1940

4 Claims. (Cl. 260—239)

The present invention relates to nitrogen containing products soluble in water and especially to urea derivatives. It is an object of the present invention to prepare compounds of the general formula

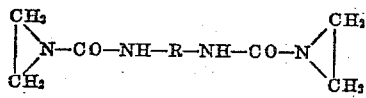

wherein R means a bivalent hydrocarbon radical selected from the group consisting of saturated aliphatic and cycloaliphatic radicals with 4 to 8 carbon atoms.

It is known to prepare nitrogen containing condensation products by reacting aliphatic isocyanic acid esters with alkylene imines, especially ethylene imine. By this reaction N'-alkyl-N,N-ethylene ureas are formed, only the lower members of which are soluble in water, whereas the higher homologues with at least 3 carbon atoms in the alkyl radical are sparingly soluble or insoluble therein. Contrary to the crystallized high molecular products sparingly soluble in water the water-soluble low molecular N'-alkyl-N,N-ethylene ureas are not obtained as crystals but in the form of liquids or oils, which, in this condition may easily undergo auto-polymerization and which partially have lost the monomeric form even after a short time.

I have found that nitrogen containing condensation products soluble in water having the general formula

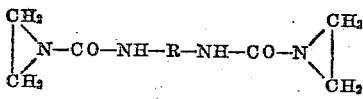

wherein R means a bivalent saturated aliphatic or cycloaliphatic radical with 4 to 8 carbon atoms, are obtained in a simple manner and in a very pure state by reacting with ethylene imine a di-iso-cyanic acid ester having the formula OC=N—R—N=CO and obtained according to the method of British Patent No. 462,182. The said products are obtained in a well crystallized state and are perfectly stable in the monomeric state. In spite of their relatively high molecular weight the compounds are readily soluble in water. As compared to the ethyleneureas obtained from mono-isocyanic acid esters, they have the advantage of being more easily polymerized to products which are distinguished from those prepared from monoethyleneureas by their considerably lower solubility. Therefore, the ureas obtained from the said di-isocyanic acid esters by means of ethyleneimine are of great industrial importance, especially for the textile, paper and leather industry.

For the reaction with ethylene imine there are suitably employed, for instance, the following di-isocyanic acid esters: 1.4-tetramethylene di-isocyanate, 1.6-hexamethylene di-isocyanate, 1.8-octamethylene di-isocyanate, 1.4-cyclohexylene di-isocyanate. The reaction is preferably executed in a solvent or diluent. On account of the heat evolved by the reaction, it is advisable to cool the reaction mixture, as otherwise a portion of the monomeric urea formed may be transformed into the insoluble polymeric state.

The following examples in which the parts are by weight serve to illustrate the invention, but they are not intended to limit it thereto.

(1) A solution of 90 parts of ethylene imine of 100 per cent strength (boiling at 54° C.–56° C.) in 300 parts of anhydrous acetone is run at 10° C.–20° C., while stirring, into a solution of 100 parts of 1.4-tetramethylene di-isocyanate in 500 parts of anhydrous acetone. The mixture is further stirred for one thour, while cooling with ice, filtered with suction at 0°, washed with ice-cold acetone and dried upon a drying plate in a vacuum chamber at room temperature. The 1.4-tetramethylene di-ethylene urea having the formula

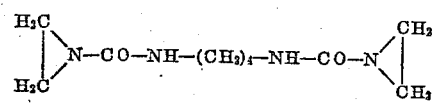

is obtained in the form of a colorless loose crystalline powder melting at 120° C.–121° C. to a clear liquid. The yield amounts to 203 parts, i. e. 90 per cent of the theoretical yield.

(2) Into a mixture of 176 parts of water and 50 parts of ice there are run, while stirring, 8.6 parts of monomeric ethylene imine (boiling at 54° C.–56° C.). 16.8 parts of 1.6-hexamethylene diisocyanate are then added in the course of half an hour. After stirring for half an hour, a clear solution is obtained which is stabilized by the addition of 1 part of an aqueous dimethylamine solution of 50 per cent strength. The solution so obtained contains 10 per cent of the 1.6-hexamethylene di-ethylene urea having the formula

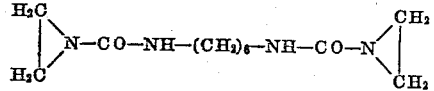

The urea may be isolated in a pure state, advantageously in the manner described in Example 1, while using acetone as the diluent. The urea is then obtained with a good yield in the form of a snow-white loose crystalline powder melting at 104° C.–105° C. to a clear liquid.

(3) Into a solution of 196 parts of 1.8-octamethylene di-isocyanate in 1000 parts of petroleum ether there is slowly run within one hour, while stirring and externally cooling the mixture, a solution of 90 parts of monomeric ethylene imine (boiling at 54° C.–56° C.) in 300 parts of petroleum ether, whereby the 1.8-octamethylene diethylene urea of the formula

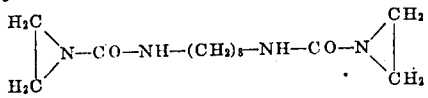

separates in the form of little crystals. The crystalline magma is further stirred for one hour, filtered with suction, washed with petroleum ether and liberated from the solvent in a vacuum chamber at room temperature. The urea is obtained with a quantitative yield in the form of a loose crystalline powder which melts at 100° C.–104° C. and readily dissolves in water.

(4) Into a mixture of 175 parts of water and 50 parts of ice there are run, while stirring, 8.6 parts of monomeric ethylene imine (boiling at 54° C.–56° C.). 16.6 parts of 1.4-cyclohexylene di-isocyanate are then added in the course of half an hour. After stirring for a short time, a clear solution is obtained which is stabilized by the addition of 1.5 parts of an aqueous ammonia solution of 25 per cent strength. The solution so obtained contains 10 per cent of the 1.4-cyclohexylene di-ethylene urea of the formula

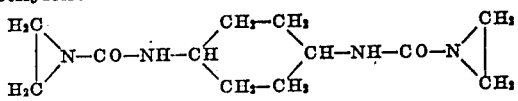

I claim:

1. Nitrogen containing products soluble in water having the general formula

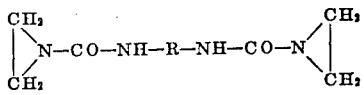

wherein R means a bivalent hydrocarbon radical selected from the group consisting of saturated aliphatic and cycloaliphatic radicals with 4 to 8 carbon atoms.

2. The product of the formula

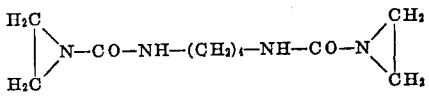

3. The product of the formula

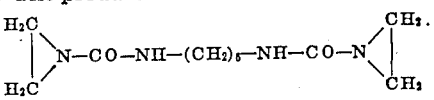

4. The product of the formula

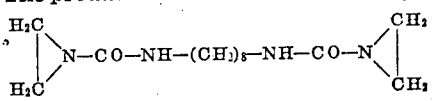

HERBERT BESTIAN.